Oct. 30, 1962  F. P. SHARPE  3,061,115
AUTOMATIC RIM LOADER
Filed March 30, 1959  7 Sheets-Sheet 5
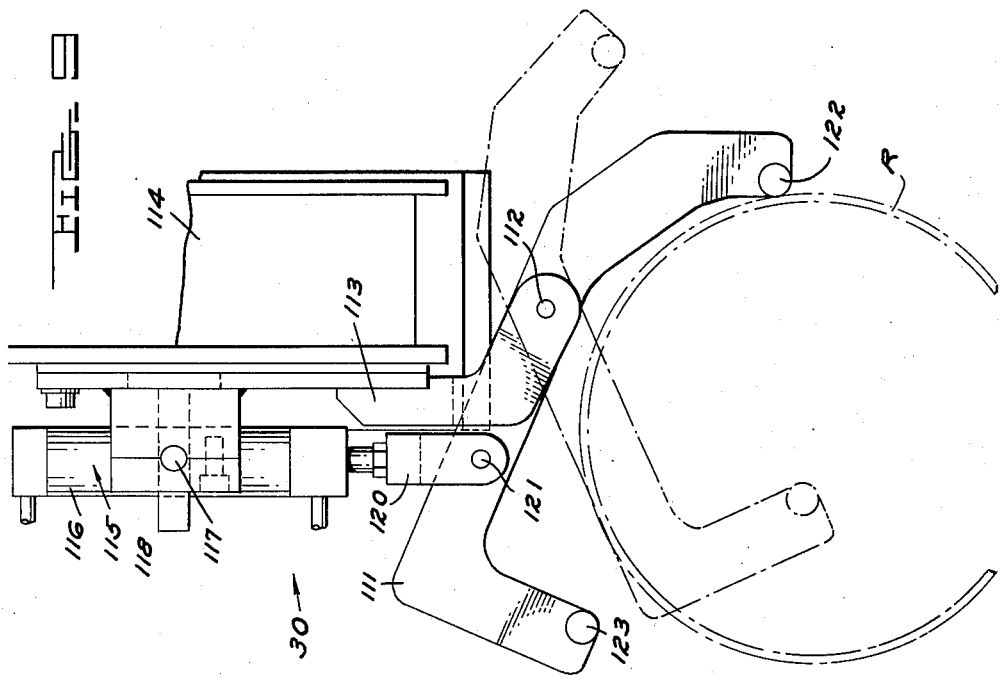
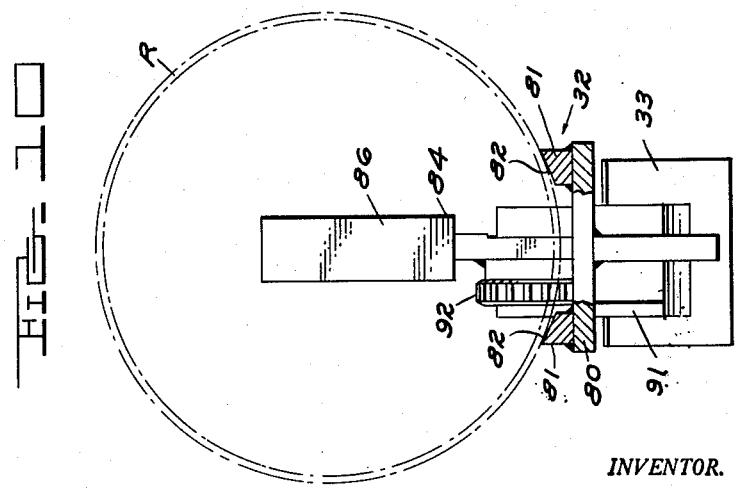
INVENTOR.
FREDERICK P. SHARPE
BY
*Whittemore, Hulbert & Belknap*
ATTORNEYS Oct. 30, 1962
F. P. SHARPE
3,061,115
AUTOMATIC RIM LOADER
Filed March 30, 1959
7 Sheets-Sheet 6
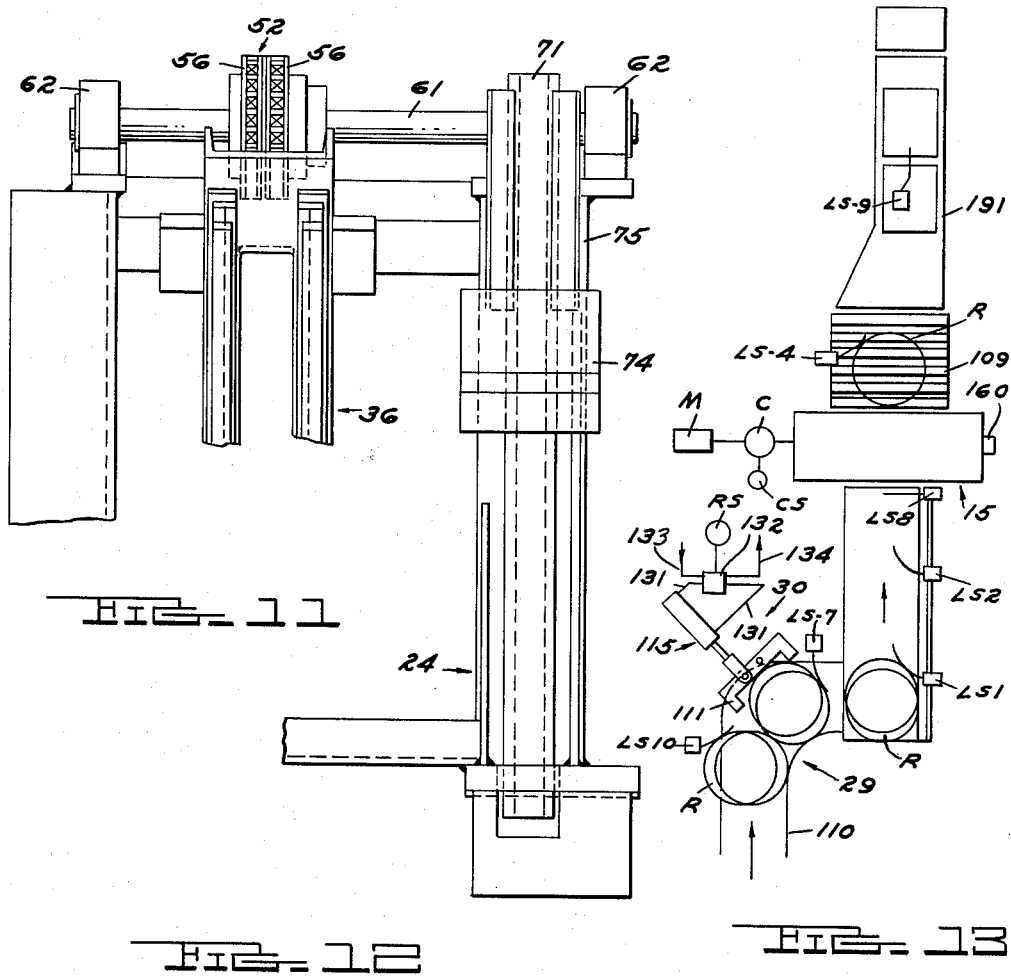
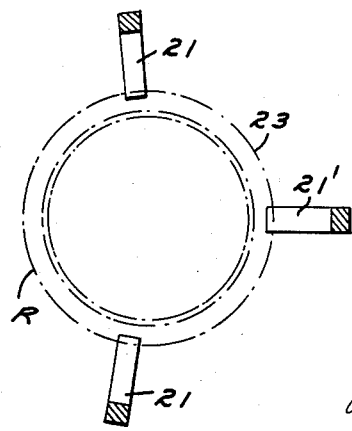
INVENTOR.
FREDERICK P. SHARPE
BY
ATTORNEYS Oct. 30, 1962  F. P. SHARPE  3,061,115
AUTOMATIC RIM LOADER
Filed March 30, 1959  7 Sheets-Sheet 7

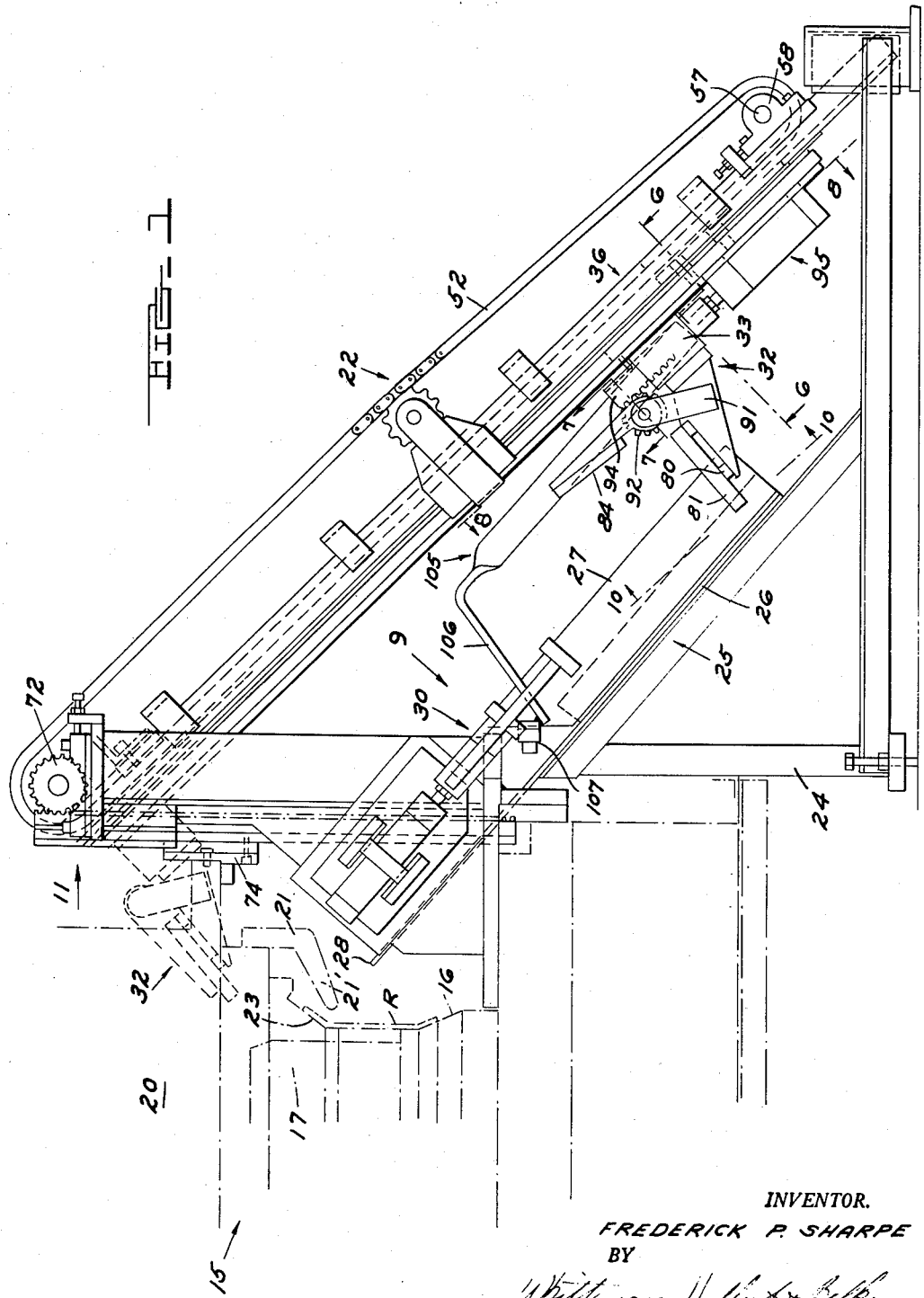

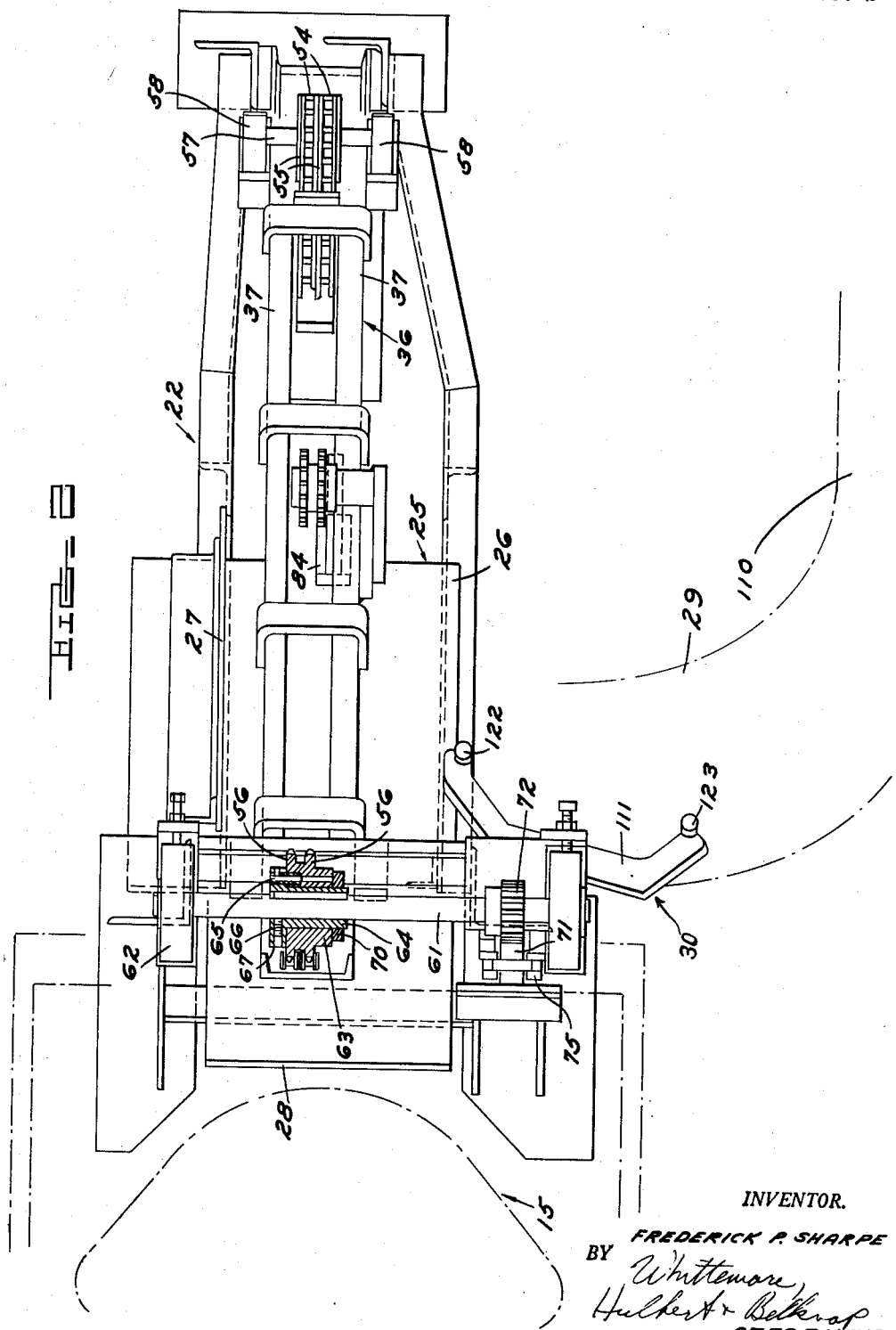

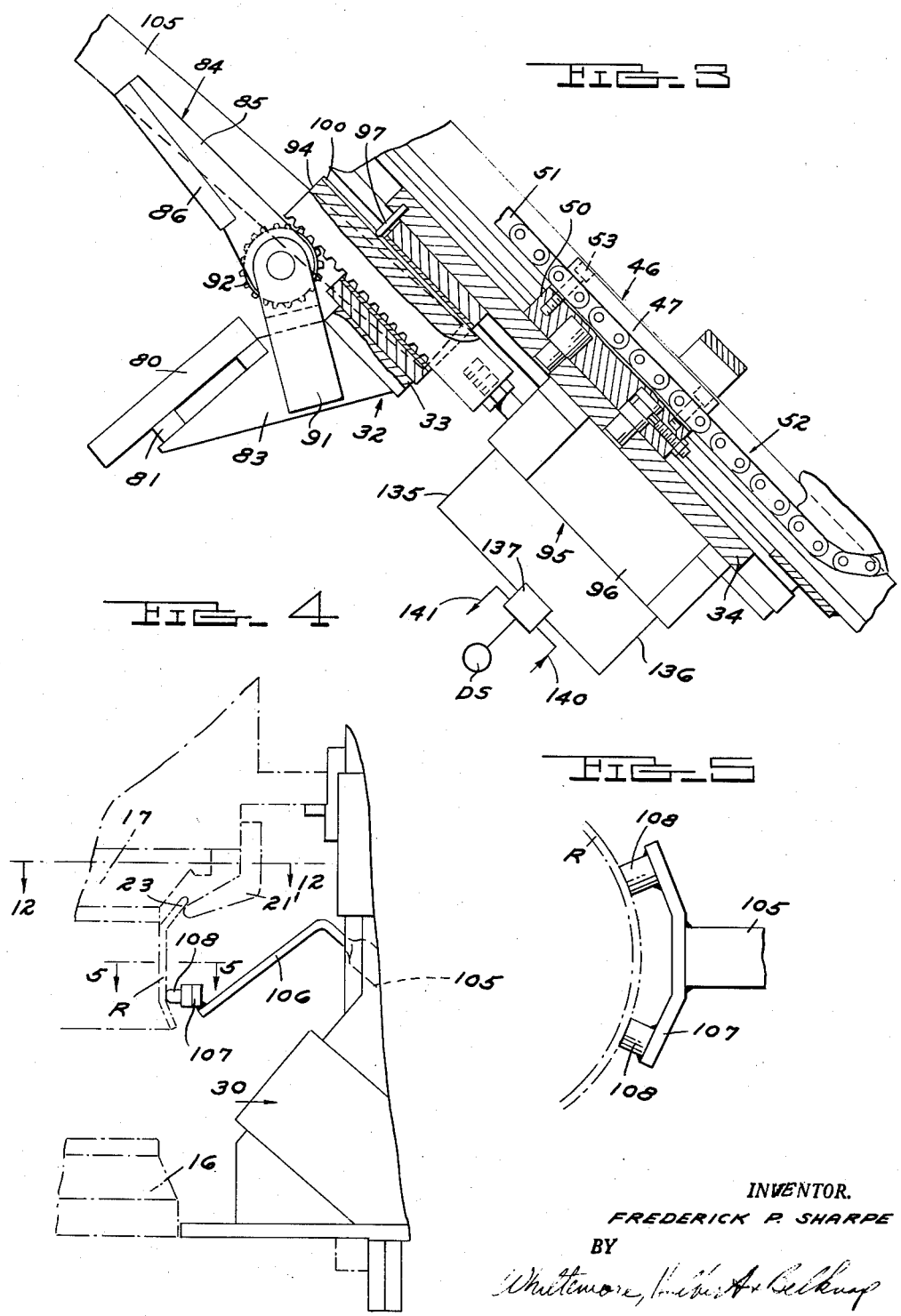

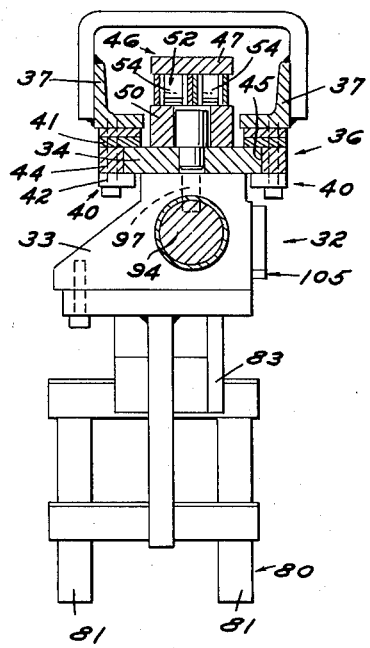
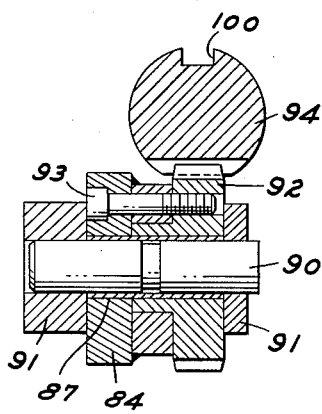
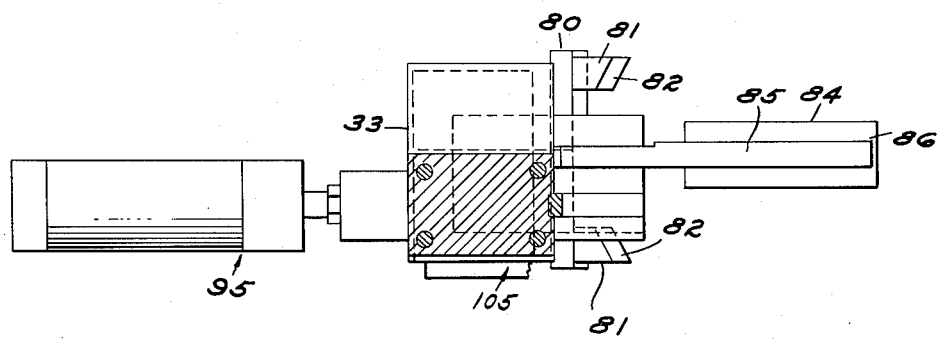

INVENTOR.
FREDERICK P. SHARPE
BY
Whittemore, Hulbert & Belknap
ATTORNEYS

United States Patent Office 3,061,115
Patented Oct. 30, 1962

3,061,115
AUTOMATIC RIM LOADER
Frederick P. Sharpe, Dearborn, Mich., assignor to Kelsey-Hayes Company, Detroit, Mich., a corporation of Delaware
Filed Mar. 30, 1959, Ser. No. 802,695
4 Claims. (Cl. 214—1)

This invention relates to loading mechanism and refers more particularly to an automatic rim loader for a rim fashioning machine.

The invention has for one of its objects to provide a loader for a rim fashioning machine, particularly the first form die for expanding rim blanks as the initial step in the manufacture of automotive wheel rims, which loader is operated automatically in timed relation to the operation of the machine to reduce manual handling of the rim blanks to a minimum.

The invention has for another object to provide a loader for a rim fashioning machine having means for individually advancing rim blanks to the machine and simultaneously ejecting the formed blanks from the machine.

The invention has for a further object to provide a rim loader for an expanding machine having cooperating dies for engaging and expanding a rim blank, said loader having reciprocable mechanism operated by the machine for individually advancing rim blanks along a guide to the machine, the reciprocable mechanism including a clamp for gripping the rim blank which is releasable to discharge the blank between the dies of the machine.

Other objects and features of the invention will become apparent as the description proceeds, especially when taken in conjunction with the accompanying drawings, illustrating a preferred embodiment of the invention, wherein:

FIG. 1 is a side elevational view showing a rim expanding machine and a loader for the machine, constructed in accordance with the invention;

FIG. 2 is a top plan view of the structure shown in FIG. 1;

FIG. 3 is an enlarged fragmentary elevation, partly in section, of the structure shown in FIG. 1;

FIG. 4 is a fragmentary elevation illustrating the manner in which a blank is discharged from the rim fashioning machine by the loader;

FIG. 5 is a view taken on the line 5—5 of FIG. 4;

FIG. 6 is a sectional view taken on the line 6—6 of FIG. 1;

FIG. 7 is a sectional view taken on the line 7—7 of FIG. 1;

FIG. 8 is a sectional view taken on the line 8—8 of FIG. 1;

FIG. 9 is a view taken in the direction of the arrow 9 in FIG. 1;

FIG. 10 is a sectional view taken on the line 10—10 in FIG. 1;

FIG. 11 is a view taken in the direction of the arrow 11 in FIG. 1, omitting the rim fashioning machine;

FIG. 12 is a view taken on the line 12—12 of FIG. 4;

FIG. 13 is a schematic plan view of the apparatus; and

Figure 14:
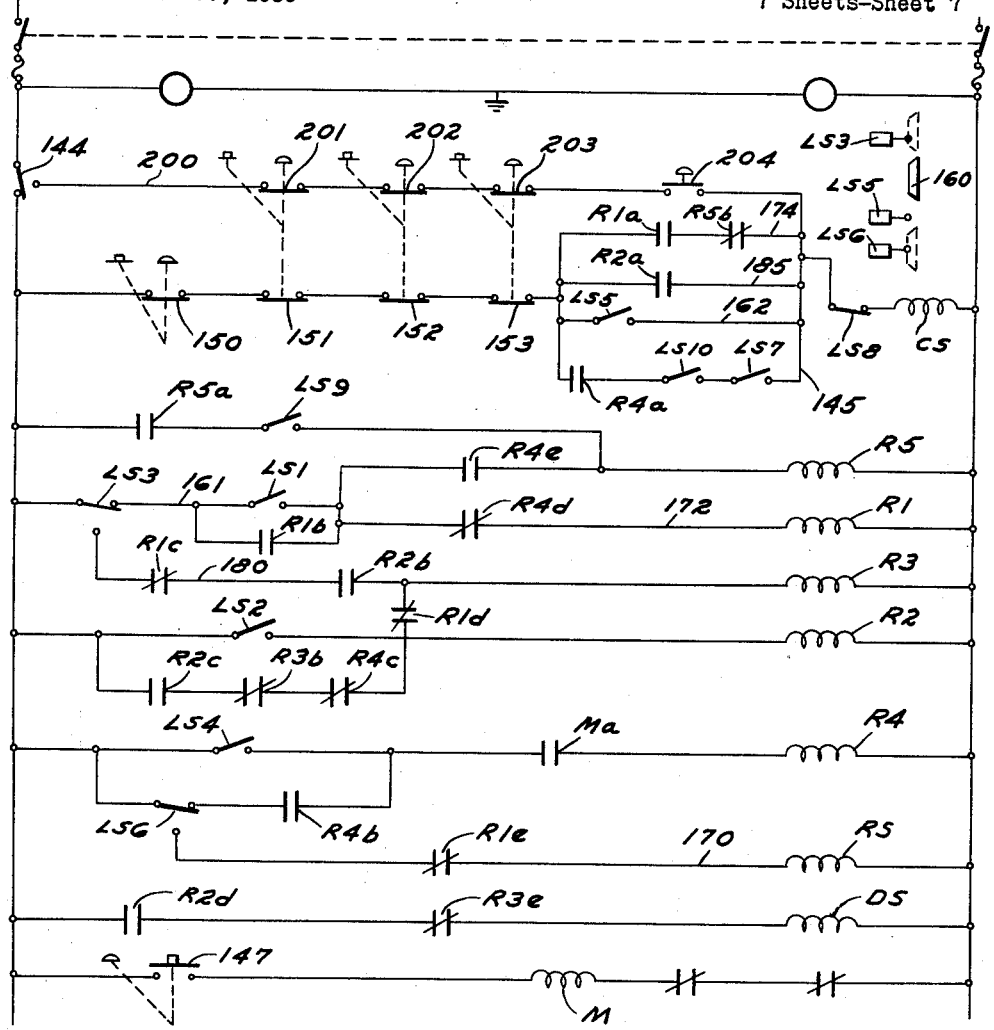
FIG. 14 shows a wiring diagram for the control of the apparatus.

Referring now more particularly to the drawings, the rim expanding machine is generally indicated at 15 and comprises a fixed lower die 16 and an upper die 17 carried by a vertically reciprocable ram 20. In this instance, the machine 15 is the first form die used for initially expanding the edges of a cylindrical blank R in the manufacture of wheel rims for automotive vehicles.

The upper die is located directly above the lower die and is movable by the ram away from the lower die to a position illustrated in FIG. 4 to permit a rim blank R to be inserted between the dies and placed over the lower die, and movable toward the lower die to the FIG. 1 position to cooperate with the lower die in expanding the opposite edge portions of the rim blank. Initially the blank R is in the form of a cylinder and after expansion in the machine 15 takes the cross-sectional appearance illustrated in FIGS. 1 and 4 in which its edges are expanded.

The upper die carries three rim blank supporting fingers 21, one of the fingers 21' being at the rear of the machine, that is at the side toward the rim loader indicated generally at 22 and described more fully hereinafter. The other two fingers are spaced forwardly as indicated in FIG. 12 to provide a three-point support for a formed rim blank. The fingers 21 extend inwardly and their inner ends lie on a circle concentric with the upper die but of greater diameter than the rim blank R before it is expanded by the machine 20 (see FIGS. 1 and 4). The circle defined by the inner extremities of fingers 21 is however of smaller diameter than the margin of the upper flange 23 formed on the rim blank in the expanding machine so that the expanded blank is picked up by the fingers and lifted from the lower die upon upward movement of the ram (FIG. 4).

The rim blanks are fed to the expanding machine 15 by the rim loader 22. The loader comprises a supporting frame 24 having a guide 25 which includes a bottom plate 26 inclined upwardly toward the expanding machine 15 at a predetermined angle and an upright side plate 27 along the righthand side of the guide, as seen in FIG. 2. The upper end of the bottom plate 26 of the guide terminates at 28 adjacent to the rear side of the rim fashioning machine. A delivery chute 29 having an escapement mechanism 30 is provided for delivering cylindrical blanks R to the guide 25 of the rim loader one at a time.

The rim loader has reciprocable mechanism including a reciprocable clamp 32 which is provided for advancing the rim blanks to the rim fashioning machine and depositing them on the lower die 16. The clamp 32 includes a mounting block 33 having a guide plate 34 secured to the top surface thereof (FIG. 6). The guide plate 34 slides along a track 36 above the guide 25 which is inclined upwardly toward the rim fashioning machine at a slightly greater angle than the guide 25. The reason for the different angles will be more apparent as the description proceeds.

The track 36 comprises a pair of opposed angle members 37 which are laterally spaced and parallel to one another and rigidly secured to the fixed frame 24 of the loader. Each track 36 has a rail 40 formed of vertically spaced rail members 41 and 42 which are parallel to one another and rigidly clamped to the associated angle member 37. Each rail also includes a separator strip 44 which spaces the rails apart and cooperates therewith to define a channel 45 for receiving a side edge of the guide plate 34 of the clamping device. The channels 45 are laterally opposed and define a path for sliding movement of the clamp which is inclined toward the rim loading machine at the angle of track 36, that is at an angle greater than that formed by the guide 25. The clamp 32 is reciprocable from a rear or retracted position shown in solid lines in FIG. 1 to a forward or advance position shown in dotted lines therein.

The clamp 32 is secured to a carrier 46. Carrier 46 has upper and lower plates 47 and 50 on opposite sides of the lower run 51 of the endless link chain 52 which are securely clamped thereto by fasteners 53. The link chain 52 is driven in opposite directions to move the carrier 46 and hence the clamping device between its limits shown in FIG. 1.

The link chain includes two parallel endless linear members 54 which are trained over sprockets 55 at the rear end of the loader and over sprockets 56 at the front end of the loader. The sprockets 55 are secured to a shaft 57 mounted in bearings 58 on loader frame 24. The sprockets 56 are secured to a shaft 61 journaled in bearings 62 on the loader frame. As shown in FIG. 2, the sprockets 56 are integrally formed on a common member 63 which is secured on a sleeve 64 by a fastening element 65. The sleeve 64 is secured to the shaft 61 against movement by the screw 66, and the member 63 is clamped against a shoulder 67 on the sleeve by a nut 70 to locate the member 63 axially of the shaft.

The link chain 52 is driven in opposite directions by the ram of the expanding machine through a vertical rack 71 on the machine in mesh with a pinion 72 secured to the shaft 61. The rack is secured to a mounting plate 74 carried by the ram and runs in a guide 75 on the frame of the rim loader to define its vertical travel. The pinion 72 is of such size that the clamp 32 moves through the limits shown in FIG. 1 upon one complete stroke of the ram 20. At the upper limit of the ram the clamp is at the forward or dotted line position shown in FIG. 1 and at the bottom of the ram stroke the clamp moves to the solid line position.

The clamp 32 has a fixed jaw 80 which is composed of the laterally spaced clamping fingers 81 which have their front surfaces 82 inclined as shown in FIG. 10 to conform to and cradle the rim blank during loading. The fingers are supported on a fixed frame 83 secured to the mounting block 33. The clamp also has a movable jaw 84 which comprises a finger 85 having a rim blank engaging part 86 and is rotatably mounted on a bushing 87 surrounding the shaft 90. Shaft 90 is mounted on the fixed frame 83 of the fixed jaw 80 by straps 91. Also rotatably mounted on the bushing 87 of the shaft is a pinion 92 rigidly secured to the jaw 84 by fasteners 93. The pinion 92 is engaged by a rack 94 freely slidable in the mounting block 33 and connected to the piston (not shown) of the air cylinder assembly 95. The cylinder 96 of assembly 95 is rigidly fastened to the guide plate 34 of the clamp. The rack is held against rotation during sliding movement by a pin 97 engaged in an elongated slot 100 thereof and fixed to the guide plate 34. When the rack 94 is withdrawn rearwardly to the position of FIG. 3 the movable jaw 84 opens as illustrated, and when the rack is extended the movable jaw is rotated to the position shown in dotted lines in FIG. 1 to engage the inner surface of a rim blank and clamp it firmly against the fixed jaw. The dotted line position of FIG. 1 shows the clamp in its advance position in which a blank carried thereby is between the dies, so that when the clamp is released the blank falls on the lower die.

The ejector bar 105 is secured to one side of mounting block 33 of the clamp and projects in a forward direction, having a downturned end 106 to which is secured a plate 107 having the rim engaging lugs 108 thereon. The lugs 108 project forwardly of the clamp jaws a substantial distance for engagement with an expanded rim blank in the machine 15 to eject the latter before the clamped blank is deposited or dropped over the lower die. The ejector moves the expanded rim blank forwardly relative to the supporting fingers 21, and the blank will rise slightly to clear the side fingers before it is ejected onto the roll-off rack diagrammatically shown at 109 in FIG. 13.

Referring to FIGS. 2, 9 and 13, rim blanks R are fed to the loader 22 by way of a chute 29. The chute has a downwardly inclined section 110 and an escapement mechanism 30 at the lower end of the section 110 for feeding blanks one at a time to the guide 25 of the loader. The escapement comprises a generally U-shaped rocker 111 which is provided on a pin 112 carried by a bracket 113 mounted on a fixed frame member 114. An air cylinder assembly 115 has its cylinder 116 pivoted at 117 to a mounting block 118 also secured to the fixed frame 114. The piston (not shown) reciprocable within cylinder 116 has a rod extension provided with a yoke 120 pivoted to the rocker 111 at 121. Pivots 112, 117 and 121 are parallel to accommodate the movement of rocker 111. One arm of the rocker has an abutment pin 122 and the other arm has an abutment pin 123 engageable with the rim blanks to feed them one at a time to the rim loader. Normally the rocker assumes the solid line position of FIG. 9 in which a line of blanks are held back in the inclined section 110 of the chute. When the rocker moves to the dotted line position, the rim blank engaged thereby is released and kicked forward into position on the guide 25 of the rim loader and the remaining blanks in the chute section 110 are held back by the rocker pin 123. Reversal of the rocker to the solid line position allows the remaining blanks in the chute to advance until the next one in line engages the rocker pin 122. It will be apparent that each full cycle of oscillation of the rocker from its solid line position and back feeds one rim blank to the loader.

The ram 20 of the expanding machine is reciprocated by a motor M through a clutch C operated by a clutch solenoid CS. The motor runs continuously and the clutch is operated to engage the motor to the ram drive by the energization of a solenoid CS. Secured to the ram 20 is a vertical cam 160, which is shown diagrammatically in FIGS. 13 and 14, for operating certain limit switches.

The air cylinder 115 for the escapement 30 is double acting with air lines 130 and 131 leading to opposite ends of the cylinder controlled by a 4-way valve 132 operated by the rocker solenoid RS. Air under pressure enters the valve through line 133 and is exhausted through line 134. When rocker solenoid RS is in its de-energized condition, valve 132 directs air under pressure to line 131 so that the rocker assumes the solid line position of FIG. 9. The air cylinder 95 for the clamp 32 is also double acting and lines 135 and 136 lead to opposite ends thereof controlled by a 4-way valve 137. The valve is operated by a solenoid DS and air under pressure is admitted to the valve through line 140 and exhausted through line 141. When solenoid DS is in its de-energized condition, valve 137 directs air under pressure to line 135 so that the clamp is open as in FIG. 4.

Briefly the operation is as follows: The ram 20 reciprocates up and down continuously, and on each down stroke of the ram the cooperating dies 16 and 17 expand a rim blank to the configuration shown in FIGS. 1 and 4. The expanded rim blank is lifted from the lower die by the fingers 21 on the ram and is ejected by the ejector 105 as the ram moves up. The ejector 105 is carried by clamp 32 which moves up and down with the ram. Thus as the ram moves up the ejector 105 first ejects the expanded rim blank and on continued upward movement of the ram, the clamp deposits a new blank on the lower die.

In the lower position of the ram, the clamp is in the bottom solid line position of FIG. 1 and open. Just before the clamp reaches bottom, the rocker 111 of the escapement is operated to kick a rim blank into the loader guide 25. As the ram moves up, the open clamp moves with it to advance the rim blank along the guide. After the blank has moved part way up the guide, a limit switch LS2 is operated by the blank to close the clamp, gripping the blank and lifting it slightly from the guide. When the clamp reaches its upper limit shown in dotted lines in FIG. 1, it opens to release the rim blank and deposit it on the lower die in position to be expanded when the ram moves down. During the subsequent downward movement of the ram, the open clamp moves downwardly to the solid line position of FIG. 1.

The operation will now be described in detail along with a description of the limit switches and wiring diagram shown in FIG. 14. To prepare for automatic operation, the switch 144 is moved to the position illustrated. A rim blank should be manually placed over the lower die of the expanding machine and the ram 20 should be in the up position. The rocker 111 will be in the position of FIG. 9 and a ram blank held thereby operates to close limit switch LS7 (FIG. 13). This limit switch is in the branch circuit 145 to the clutch solenoid CS and is of course closed by the rim blank. It is necessary for there to be another rim blank behind the one engaged by the rocker to operate and close limit switch LS10 also in the branch circuit 145. The ram motor M is started by closing the switch 147 and the switches 150, 151, 152 and 153 are manually closed. The circuit to the clutch solenoid CS may now be completed through circuit 145 when relay R4 is energized to close its normally open contact R4a in the latter circuit. This relay is energized by the limit switch LS4 which is normally operated by an expanded rim blank leaving the expanding machine, but when starting the operation, this limit switch is operated by hand. The relay R4 is energized through the now closed contact Ma of the motor coil M to engage the clutch and start the ram 20 down toward the rim blank on the lower die. Since the clamping device 32 is geared to the ram 20 by the rack 71 and pinion 72, the clamping device likewise begins to move down from its upper limit shown in dotted lines in FIG. 1. During this downward movement the clamp is open. The limit switch LS4 may be released and the circuit to relay R4 is sealed in through contact R4b.

The cam 160 moves as a unit with ram 20 between the limits shown on the wiring diagram in FIG. 14, and in the upper limit of the ram the cam engages limit switch LS3 to shift it from the FIG. 14 position to close circuit 180. However as the ram moves downwardly the limit switch LS3 is released and assumes the position shown closing circuit 161, and the limit switches LS5 and LS6 are operated in sequence. Limit switch LS5 closes to complete the circuit 162 to the clutch solenoid, but is opened just before the ram reaches bottom. Before the ram reaches bottom and before LS5 opens, LS6 is operated by the cam to close circuit 170 to the rocker solenoid RS through the normally closed contact R1e of relay R1. LS6 is held in this position by the cam 160 until the ram moves up. Relay R4 is thus de-energized to open the circuit 145 to the clutch solenoid but the latter remains energized through the circuit containing LS5. As a result of the energization of rocker solenoid RS, the valve 132 is shifted to move rocker 111 to the dotted line position of FIG. 9 to kick a rim blank into the guide 25 of the loader. This has the effect of releasing limit switch LS7 allowing it to assume the open position shown in the wiring diagram. Limit switch LS10 also opens at this point because of the movement of the rim blanks in the chute. Limit switch LS1 is closed by a rim blank received at the bottom of the rim loader. LS1 is thus closed before the ram reaches bottom and before LS5 is released closing circuit 172 to relay R1 through the normally closed contact R4d of the de-energized relay R4. Energization of relay R1 opens the normally closed contact R1e in circuit 170 to de-energize the rocker solenoid RS, returning the rocker to the FIG. 9 position so that limit switches LS7 and LS10 are again operated by rim blanks in the chute.

Since LS1 is closed before the ram reaches bottom and before LS5 opens, the clutch solenoid CS remains energized through circuit branch 174 containing the closed contact R1a of relay R1. The open clamp receives the blank R at the bottom of the loader, continues a very short distance to the solid line position of FIG. 1, and then begins its upward movement with the ram. As the ram moves up, LS6 is released and resumes its illustrated position.

It will be understood that during the downward movement of the ram the rim blank between the dies was shaped to the cross-section shown in FIGS. 1 and 4. As the ram moves up the expanded blank is lifted from the lower die by the fingers 21. Upward movement of the ram causes the open clamp to advance the rim blank (FIG. 10) upwardly along the loader guide 25 by engagement with the fixed jaw of the clamp. The blank is cradled in the fingers of the fixed jaw. Limit switch LS1 is released by the rim blank as it moves up but the circuit to relay R1 remains closed through its contact R1b. Following the release of limit switch LS1, limit switch LS2 is closed by the advancing rim blank to energize relay R2 and close the circuit to the clamp solenoid DS through contact R2d. This shifts the clamp solenoid valve 137 from its normal position to clamp the rim blank, and because the track 36 for the clamp is inclined at a greater angle than the guide 25, the gripped rim blank is picked up from the guide and gradually separates therefrom upon continued forward movement. Limit switch LS2 is passed by the blank and permitted to open, but relay R2 remains energized through its contact R2c. Limit switch LS3 is again operated by the ram cam 160 at its upper limit to de-energize relay R1 and to close the circuit 180 thereby keeping relay R2 energized. The closed circuit 180 also energizes relay R3, opening its contact R3e to open the circuit to the clamp solenoid DS thereby releasing the rim blank. The opening of the clamp takes place at the top of the ram stroke so that the clamp is in position to drop the rim blank over the lower die and deposit it thereon. The clamp is shown in its forward position in dotted lines in FIG. 1 before opening. The continued energization of relay R2 closes the circuit 185 to the clutch solenoid through relay contact R2a to assure the completion of the cycle after relay R1 is de-energized.

It will be understood that before the delivered rim blank is released and deposited on the lower die, the ejector 105 which moves with the clamp engages the formed rim blank supported on the ram fingers 21 and pushes it forwardly from engagement therewith. As the rim blank moves forwardly relative to the side fingers, it of course rises somewhat to clear the fingers before it is ejected onto the downwardly inclined roll-off rack diagrammatically shown at 109 in FIG. 13. From the roll-off rack the rim blank moves down a chute 191 to a rolling machine next in the series of operations.

The operation of the expanding machine and loader will continue without interruption to successively form rim blanks and eject them from the machine. In succeeding operations, the limit switch LS4 need not be manually operated but is engaged and operated by a formed rim blank ejected onto the roll-off rack. LS4 is then normally released by the blank before LS1 is operated. During the downward movement of the ram in succeeding operations the limit switch LS3 returns to its normal position de-energizing relays R2 and R3. Since the relay R2 is de-energized, the circuit to the clutch solenoid now must pass through branch 145. Therefore if the rim blank did not properly discharge from the press to operate limit switch LS4, relay R4 will not be energized to close this branch circuit and the ram will stop. Likewise, the ram will stop unless limit switches LS7 and LS10 are operated by rim blanks in the delivery chute.

Limit switch LS8 is in the circuit to the clutch solenoid. This limit switch is located at the upper end of the loader guide. Normally the rim blank, if properly clamped, will pass over this limit switch by reason of the clamp moving at a greater angle than the guide. However if the rim blank is not clamped, by reason of a failure of air pressure in the clamp cylinder, for example, limit switch LS8 will be operated by the blank to stop the ram. Likewise, the failure of limit switch LS2 to operate will stop the ram when the circuit to the clutch solenoid is through branch 185.

In the event of an overload of motor M, its contact Ma in the circuit to relay R4 will open to deenergize the clutch solenoid.

In the event that a pile-up of rim blanks occurs in the discharge chute 191 back to the roll-off rack, the stalled rim blanks will engage and hold closed limit switches LS4 and LS9. Therefore, when limit switch LS1 is operated near the bottom of the stroke, relay R5 will be energized through the closed contact R4e. Energization of relay R5 opens its contact R5b to open the circuit 174 to the clutch solenoid to stop the machine. As the blanks in the chute 191 are gradually cleared, limit switch LS4 is released to open contact R4e, but relay R5 remains energized through its contact R5a and limit switch LS9. LS9 opens when the backed-up blanks in chute 191 move past it, to de-energize R5. As a result, the circuit to the clutch solenoid CS is re-established through circuit branch 174 and the operation continues. A pile-up of blanks in chute 191 may result if the rolling machine next in the sequence of operations is slower than the first form die 15.

Manual operation is possible by moving switch 144 to close circuit 200. This circuit is completed to the clutch solenoid by manual contacts 201, 202 and 203 and inch button 204.

What I claim as my invention is:

1. Mechanism for delivering a rim blank from a loading station to a work station including an elongated rim guide extending between said stations, a clamp above and movable along said guide in a forward direction toward said work station and in a rearward direction toward said loading station, means for thus moving said clamp, said clamp having a body and a first jaw rigidly fixed at one end to said body and extending from its fixed end toward said guide at substantially a right angle thereto to engage a rim blank on said guide and push it as a unit with said clamp to said work station during forward movement of said clamp, said clamp having a second jaw pivoted at one end to said body adjacent the fixed end of said first jaw for movement from a released position relative to said first jaw in which it extends from its pivoted end in a forward direction generally toward said work station to a clamping position relative to said first jaw in which it extends toward said guide at substantially a right angle thereto along the forward side of said first jaw, means for pivoting said second jaw from its released position to its clamping position to clamp a rim blank, means for pivoting said second jaw from its clamping position to its released position when said clamp is at said work station to release the rim blank, said guide being inclined upwardly in a forward direction, said first jaw including portions spaced apart transversely of said guide and extending from the body of said clamp toward said guide at substantially a right angle thereto, said spaced portions of said first jaw being adapted to engage spaced portions of the rim blank and center it therebetween during the initial advance of said clamp in a forward direction and prior to movement of said second jaw to clamping position, said second jaw comprising a single member between the transversely spaced portions of said first jaw, and control means for operating said first-mentioned pivoting means subsequently to initial movement of said clamp in a forward direction toward said work station sufficient to cradle the rim blank between said spaced portions of said first jaw.

2. Mechanism for delivering a rim blank to an operative position including an inclined rim guide having its upper end positioned adjacent said operating position, a releasable gripping device movable along said guide to said operative position, means for operating said gripping device to grip a rim blank on said guide for movement of the latter as a unit with said device to said operative position, means for operating said device to release the blank in the operative position of said device, the path of movement of said gripping device being inclined at a greater angle than said guide so that the blank when properly gripped by said device separates from said guide during the continued movement of said device, means for stopping said mechanism, and control means adapted to operate said stopping means when actuated, said control means being positioned along said guide to be passed over and cleared by a properly gripped blank but to be actuated by a blank not properly gripped by said device.

3. Mechanism for delivering a rim blank to an operative position including an inclined rim guide having its upper end positioned adjacent said operative position, a clamp, means for moving said clamp along said guide to said operative position, said clamp having a fixed jaw engageable with a rim blank on said guide for moving it therealong, said clamp having a jaw movable to clamping and released positions relative to said fixed jaw, means operated by the rim blank on said guide for operating said movable jaw to grip the blank and move the same as a unit with said clamp to said operative position, means operated by the movement of said clamp to said operative position for operating said movable jaw to release said blank, the path of movement of said clamp being inclined at a greater angle than said guide so that the rim blank when properly gripped by said clamp separates from said guide during the continued movement of said clamp, and a limit switch positioned along said guide to be passed over and cleared by a properly gripped blank, said limit switch stopping said mechanism when operated by a blank on said guide not properly gripped by said clamp.

4. Mechanism for delivering a workpiece to an operative position including a guide leading to said operative position, a releasable gripping device movable along said guide to said operative position, means for operating said gripping device to grip a workpiece on said guide for movement of the latter as a unit with said device to said operative position, means for operating said device to release the workpiece in the operative position of said device, the path of said gripping device being inclined with respect to said guide so that the workpiece when properly gripped by said device separates from said guide during the continued movement of said device toward said operative position, and means for stopping the movement of said gripping device toward said operative position including a control member positioned along said guide to be passed over and cleared by a properly gripped workpiece but to be actuated by a workpiece not properly gripped by said device.

References Cited in the file of this patent

UNITED STATES PATENTS

| | | |
|---|---|---|
| 1,921,393 | Lorenz | Aug. 8, 1933 |
| 1,933,225 | Smith | Oct. 31, 1933 |
| 2,939,577 | Sneed | Dec. 12, 1933 |
| 2,181,020 | LeJeune | Nov. 21, 1939 |
| 2,243,305 | Adler | May 27, 1941 |
| 2,314,123 | Butterfield | Mar. 16, 1943 |
| 2,675,848 | Greenshields et al. | Apr. 20, 1954 |
| 2,792,921 | Sharpe | May 21, 1957 |
| 2,828,849 | Sharpe | Apr. 1, 1958 |
| 2,901,126 | Halberstadt | Aug. 25, 1959 |
| 2,910,321 | Sehn | Oct. 27, 1959 |